United States Patent [19]
Roueche

[11] 3,988,312
[45] Oct. 26, 1976

[54] TETRAKISAZO PIGMENTS PREPARED BY REACTING AN AMINOAZOBENZENE AND AN ARYL-BIS-ACETOACETYLAMINO DERIVATIVE

[75] Inventor: Armand Roueche, Bottmingen, Switzerland

[73] Assignee: Ciba-Geigy Corporation, Ardsley, N.Y.

[22] Filed: June 24, 1975

[21] Appl. No.: 589,983

Related U.S. Application Data

[63] Continuation of Ser. No. 479,963, June 17, 1974, abandoned.

[30] Foreign Application Priority Data

June 21, 1973 Switzerland.......................... 9025/73

[52] U.S. Cl.................................... 260/166; 106/23; 106/288 Q; 106/297; 106/300; 106/308 Q; 106/308 N; 260/37 R; 260/37 SB; 260/37 NP; 260/40 R; 260/42.21; 260/205; 260/206; 260/207; 260/207.1; 260/562 K; 428/412; 428/423; 428/425; 428/446; 428/447; 428/474; 428/480; 428/492; 428/500

[51] Int. Cl.$^2$.................. C09B 31/30; C09B 35/50; D06P 1/08

[58] Field of Search ........... 260/166, 167, 168, 176

[56] References Cited

UNITED STATES PATENTS

| | | | |
|---|---|---|---|
| 1,594,865 | 8/1926 | Zitscher.......................... | 260/168 X |
| 2,300,636 | 11/1942 | Sieglitz et al. ...................... | 260/166 |
| 2,571,990 | 10/1951 | Stratton .......................... | 260/166 X |
| 3,413,279 | 11/1968 | Mueller.............................. | 260/176 |
| 3,657,219 | 4/1972 | Ronco et al. ...................... | 260/176 |
| 3,872,078 | 3/1975 | Cseh et al. .......................... | 260/176 |

*Primary Examiner*—Floyd D. Higel
*Attorney, Agent, or Firm*—Vincent J. Cavalieri

[57] ABSTRACT

New tetrakisazo pigments of the formula

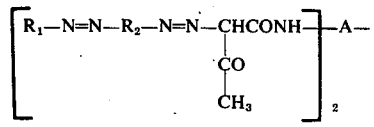

wherein A, $R_1$ and $R_2$ denote a benzene or naphthalene radical, are prepared. The compounds may be used for pigmenting high-molecular organic material such as cellulose ethers, polyvinyl chloride and polypropylene. The pigments have high tinctorial and good fastness to migration.

6 Claims, No Drawings

TETRAKISAZO PIGMENTS PREPARED BY REACTING AN AMINOAZOBENZENE AND AN ARYL-BIS-ACETOACETYLAMINO DERIVATIVE

This is a continuation of application Ser. No. 479,963 filed on June 17, 1974, now abandoned.

It has been found that new, valuable tetrakisazo pigments of the formula

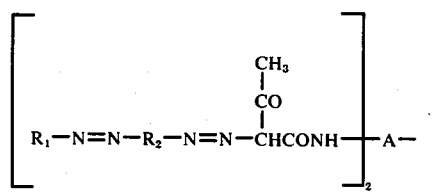

wherein A, $R_1$ and $R_2$ denote a benzene or naphthalene radical, are obtained if a diazo or diazoamino compound of an amine of the formula

 (II)

is coupled in the molar ratio 2:1 with a bis-acetoacetylamino derivative of the formula

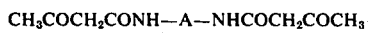 (III)

Azo pigments of particular interest are those of the formula

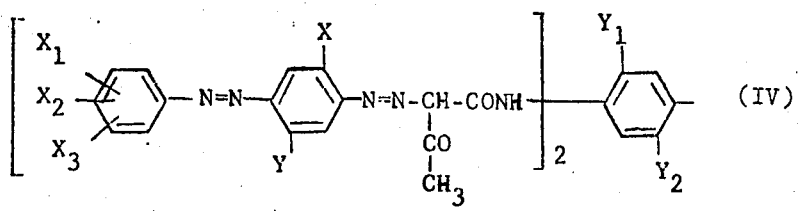

wherein X denotes a hydrogen or halogen atom, an alkyl or alkoxy group containing 1 – 4 carbon atoms, or a nitro or carboxylic acid ester group, Y denotes a hydrogen or halogen atom, or an alkyl or alkoxy group containing 1 – 4 carbon atoms, $X_1$ denotes a hydrogen or halogen atom, an alkyl, alkoxy or alkanoylamino group containing 1 – 4 carbon atoms, a nitro, nitrile, trifluoromethyl or carboxylic acid ester group or a phenoxy or aroylamino group which is optionally substituted by halogen atoms or alkyl or alkoxy groups containing 1 – 4 carbon atoms, $X_2$ and $X_3$ denote hydrogen or halogen atoms, alkyl or alkoxy groups containing 1 – 4 carbon atoms, or nitro, trifluoromethyl or carboxylic acid ester groups, and $Y_1$ and $Y_2$ denote hydrogen or halogen atoms, alkyl or alkoxy groups containing 1 – 4 carbon atoms, nitro, nitrile or trifluoromethyl groups or alkoxycarbonyl groups containing 2 – 6 carbon atoms.

Amines of the formula

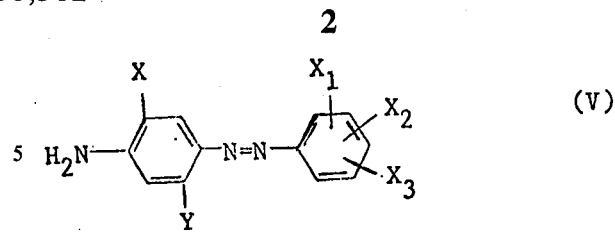

wherein X, Y, $X_1$, $X_2$ and $X_3$ have the meaning mentioned above, are preferably used as the diazo component.

The following examples of diazo components of the formula II may be mentioned: 4-amino-azobenzene, 4-amino-2'-chloroazobenzene, 4-amino-4'-chloroazobenzene, 4-amino-4'-methylazobenzene, 4-amino-4'-methoxyazobenzene, 4-amino-2',4'-dichloroazobenzene, 4-amino-2',5'-dichloroazobenzene, 4-amino-2',4',5'-trichloroazobenzene, 4-amino-2',3',4'-trichloroazobenzene, 4-amino-3',4',5'-trichloroazobenzene, 4-amino-2',4'-dimethylazobenzene, 4-amino-2'-methyl-3'-chloroazobenzene, 4-amino-2'-methoxy-5'-chloroazobenzene, 4-amino-2,5-dimethyl-azobenzene, 4-amino-2,5-dimethyl-4'-chloroazobenzene, 4-amino-2,5-dimethyl-4'-methylazobenzene, 4-amino-2,5-dimethyl-4'-methoxyazobenzene, 4-amino-2,5-dimethyl-2',4'-dichloroazobenzene, 4-amino-2,5-dimethyl-4'-nitroazobenzene, 4-amino-2,5-dimethyl-3'-trifluoromethylazobenzene, 4-amino-2,5-dimethyl-4'-carbomethoxyazobenzene, 4-amino-2,5-dimethyl-4'-cyano-azobenzene, 4-amino-5-chloro-4'-methoxy-azobenzene, 4-amino-5-methyl-4'-chloroazobenzene, 4-amino-5-methoxy-4'-chloroazobenzene, 4-amino-5-chloro-2-methoxy-4'-methoxyazobenzene, 4-amino-2,5-dimethoxy-azobenzene, 4-amino-2,5-diethoxy-azobenzene, 4-amino-2-methyl-5-chloro-4'-methoxyazobenzene, 4-amino-2,5-dimethyl-2'-nitro-azobenzene, 3-amino-4'-methoxyazobenzene, 3-amino-4,4'-dimethoxy-azobenzene, 3-amino-4-methyl-4'-methoxyazobenzene, 4-amino-1,1'-azonaphthalene, 4-amino-2-methoxy-4'-chloroazobenzene, 4-amino-2-methyl-4'-methoxyazobenzene, 4-amino-3-nitro-azobenzene and 4-amino-3',5'-dicarbomethoxy-azobenzene.

These are known compounds, which can be obtained by coupling the components.

The coupling components of the formula III used are preferably those of the formula

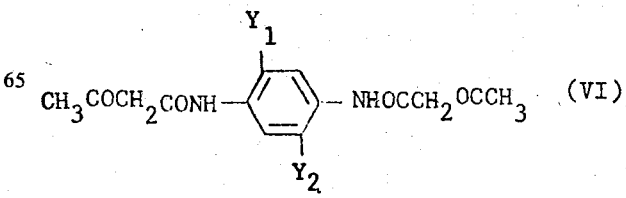

wherein $Y_1$ and $Y_2$ have the indicated meaning.

These are known compounds, which are obtained by the action of diketene or of acetoacetic esters on arylenediamines of the formula $H_2N—A—NH_2$.

The following examples may be mentioned: 1,4-phenylenediamine, 2-chloro-1,4-phenylenediamine, 2-bromo-1,4-phenylenediamine, 2-trifluoromethyl-1,4-phenylenediamine, 2-cyano-1,4-phenylenediamine, 2-methyl-1,4-phenylenediamine, 2-methoxy-1,4-phenylenediamine, 2-ethoxy-1,4-phenylenediamine, 2-nitro-1,4-phenylenediamine, 2-methoxycarbonyl-1,4-phenylenediamine, 2-ethoxycarbonyl-1,4-phenylenediamine, 2,3-dichloro-1,4-phenylenediamine, 2,5-dichloro-1,4-phenylenediamine, 2,6-dichloro-1,4-phenylenediamine, 2-chloro-5-methyl-1,4-phenylenediamine, 2-chloro-5-methoxy-1,4-phenylenediamine, 2,5-dimethyl-1,4-phenylenediamine, 2-methyl-5-methoxy-1,4-phenylenediamine, 2,5-dimethoxy-1,4-phenylenediamine, 2,5-diethoxy-1,4-phenylenediamine, 2,5-diethoxycarbonyl-1,4-phenylenediamine, 2,3,5-trichloro-1,4-phenylenediamine, 2,3,5,6-tetrachloro-1,4-phenylenediamine, 2,5-dimethyl-3,6-dichloro-1,4-phenylenediamine, 1,3-phenylenediamine, 4-chloro-1,3-phenylenediamine, 2-methyl-1,3-phenylenediamine, 4-methyl-1,3-phenylenediamine, 4-methoxy-1,3-phenylenediamine, 2,4-dichloro-1,3-phenylenediamine, 2,5-dichloro-1,3-phenylenediamine, 4,6-dichloro-1,3-phenylenediamine, 4,6-dimethyl-1,3-phenylenediamine, 2,6-dimethyl-1,3-phenylenediamine, 1,4-naphthylenediamine, 1,5-naphthylenediamine and 2,6-naphthylenediamine.

The coupling is preferably carried out in a weakly acid medium, appropriately in the presence of customary agents which promote the coupling. Dispersing agents should be mentioned particularly as such agents, for example aralkylsulphonates, such as dodecylbenzenesulphonate or 1,1'-dinaphthylmethane-2,2'-disulphonic acid, or polycondensation products of alkylene oxides. The dispersion of the coupling component can also advantageously contain protective colloids, for example methyl cellulose, or minor amounts of inert organic solvents which are sparingly soluble or insoluble in water, for example optionally halogenated or nitrated aromatic hydrocarbons, such as benzene, toluene, xylene, chlorobenzene, dichlorobenzene or nitrobenzene, and aliphatic halogenated hydrocarbons, such as, for example, carbon tetrachloride or trichloroethylene, and also organic solvents which are miscible with water, such as acetone, methyl ethyl ketone, methanol, ethanol or isopropanol.

The coupling can also be carried out with advantage by combining an acid solution of the diazonium salt with an alkaline solution of the coupling component in a mixing jet, an immediate coupling of the components taking place. Care must be taken that the diazo components and the coupling components are present in the mixing jet in equimolecular quantities, it being found advantageous to use a slight excess of the diazo component. This is effected most simply by controlling the pH-value of the liquid in the mixing jet. Care must also be taken to ensure a vigorous turbulence of the two solutions in the mixing jet. The resulting dyestuff dispersion is continuously withdrawn from the mixing jet and the dyestuff is separated by filtration.

The coupling can also be carried out by heating a diazoamino compound of the amine to be used as the diazo component with the diacetoacetylphenylenediamine in an organic solvent, if appropriate in an aqueous organic solvent, preferably in the presence of an acid.

The diazoamino compounds to be used in accordance with the process are obtained by known processes by coupling a diazonium salt of the amine acting as the diazo component with a primary, or preferably with a secondary, amine.

The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, tripropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, cycloaliphatic amines such as cyclohexylamine, N-methylcyclohexylamine and dicyclohexylamine, aromatic amines such as 4-aminobenzoic acid, sulphanilic acid, 4sulpho-2-aminobenzoic acid, (4-sulphophenyl)-guanidine, 4-N-methylaminobenzoic acid, 4-ethylaminobenzoic acid, 1-aminonaphthalenesulphonic acid and 1-aminonaphthalene-2,4-disulphonic acid, heterocyclic amines such as piperidine, morpholine, pyrrolidine and dihydroindole, and, finally, also sodium cyanamide or dicyandiamide.

As a rule the resulting diazoamino compounds are sparingly soluble in cold water and can be separated from the reaction medium in a crystalline form, optionally after salting out. In many cases the moist press cakes can be used for further reaction. In individual cases it can prove advisable to free the diazoamides from water by vacuum drying prior to the reaction or to remove the water by azeotropic distillation after suspending the moist press cake in a solvent.

The coupling of the diazoamino compounds with the naphthol is carried out in an organic solvent, for example chlorobenzene, o-dichlorobenzene, nitrobenzene, pyridine, ethylene glycol, ethylene glycol monomethyl or monoethyl ether, dimethylformamide, N-methylpyrrolidone, formic acid or acetic acid. When using solvents which are miscible with water, it is not necessary to use the diazoamino compound in an anhydrous form. It is possible, for example, to use the filter cakes, moist with water. The splitting of the diazoamino compound which precedes the coupling is carried out in an acid medium. If neutral solvents are used, the addition of an acid, for example hydrochloric acid, sulphuric acid, formic acid, acetic acid or chloroacetic acid is necessary.

The coupling is suitably carried out hot, preferably at temperatures between 80° and 180° C and it generally proceeds very rapidly and completely.

By virtue of their insolubility, the resulting pigments can be isolated from the reaction mixtures by filtering. It is found advantageous to after-treat the resulting pigments with an organic solvent, preferably one boiling above 100° C. The following prove particularly suitable: benzenes substituted by halogen atoms or alkyl or nitro groups, such as xylenes, chlorobenzene, o-dichlorobenzene or nitrobenzene, and pyridine bases, such as pyridine, picoline or quinoline, and also ketones, such as cyclohexanone, ethers, such as ehtylene glycol monomethyl or monoethyl ether, amides, such as dimethylformamide or N-methyl-pyrrolidone, and sulphoxone.

The after-treatment is preferably carried out by heating the pigment in the solvent to 100°–180° C, a coarsening of grain taking place in many cases, which has an advantageous effect on the fastness to light and migration of the resulting pigments.

Finally, the coupling can also be carried out by suspending the amine to be diazotised, together with the coupling component in the molar ratio 2:1, in an organic solvent and treating the mixture with a diazotising agent, especially an ester of nitrous acid, such as methyl, ethyl, butyl, amyl or octyl nitrite.

The new dyestuffs represent valuable pigments which can be used in a finely divided form for pigmenting high-molecular organic material, for example cellulose ethers and esters, high-molecular polyamides or high-molecular polyurethanes or polyesters, acetylcellulose, nitrocellulose, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, and thermoplastic or thermosetting acrylic resins, rubber, casein, silicone and silicone resins, individually or as mixtures.

parts of ice and subsequently cooling to 0° C, 26 parts by volume of 4 N sodium nitrite are then added dropwise. The yellow diazo solution is then stirred at 0° – 5° C until only traces of nirous acid can be detected. The diazo solution is then filtered, with the addition of a little decolourising charcoal, to give a clear solution. The filtrate is brought to pH 4 by adding 40 parts of crystalline sodium acetate.

At the same time 17.5 parts of 2,5-dichloro-1,4-bis-acetoacetylaminobenzene are dissolved in 100 parts of water by means of 80 parts by volume of 40% strength sodium hydroxide solution and 5 parts of n-butylsulphoricinoleate are added. This solution is then filtered with a little decolorizing charcoal to give a clear solution and is then added dropwise, with good stirring, to the diazo solution over the course of ½ hour. The mixture is stirred for 2 to 3 hours at room temperature until diazo solution can no longer be detected and is then warmed to 80° – 86° C for 1 hour and filtered hot and the filter residue is washed free from salt with hot water. After drying at 95° – 100° C in vacuo, 35 parts of a yellow dyestuff of the formula

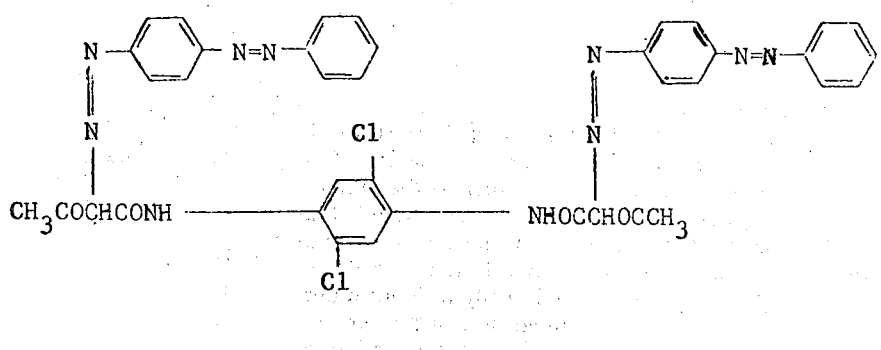

are obtained.

35 parts of the pigment thus obtained are stirred in 400 parts by volume of o-dichlorobenzene at 145° – 150° C for 2 hours. The mixture is filtered at 140° C, and the filter residue is washed with boiling o-dichlorobenzene until the filtrate comes through nearly colorless, and is then washed with cold methanol and finally with hot water. After drying, 29 parts of a greenish-tinged yellow organic pigment are obtained. In printing inks it gives strong and pure greenish-tinged yellow prints.

In this it is immaterial whether the high-molecular compounds are present as plastic compositions or melts or in the form of spinning solutions, lacquers or paints. The new pigments are found to be particularly suitable for printing inks. Depending on the application, it is found advantageous to use the new pigments as toners or in the form of preparations. In addition to the pure pigment, the preparations can contain, for example, natural resins, for example abietic acid or esters thereof, ethylcellulose and cellulose acetobutyral, alkaline earth metal salts of higher fatty acids, fatty amines, for example stearylamine or rosin amine, vinyl chloride-vinyl acetate copolymers, polyacrylonitrile or polyterpene resins or water-soluble dyestuffs, for example dyestuff sulphonic acids or alkaline earth metal salts thereof.

The pigments according to the invention are distinguished by high tinctorial strength and the dyeings obtained with them are distinguished by particularly pure colour shades and good fastness to migration.

In the following examples, unless otherwise stated, the parts denote parts by weight and the percentages denote percentages by weight.

EXAMPLE 1

21 parts of 4-aminoazobenzene in 200 parts by volume of glacial acetic acid are stirred with 28 parts by volume of 30% strength hydrochloric acid, the hydrochloride of the base being formed. After adding 70

EXAMPLE 2

27 parts of 4-amino-2,5-dimethyl-4'-methoxyazobenzene in 250 parts by volume of glacial acetic acid and 30 parts by volume of 30% strength hydrochloric acid are diazotized at 0° – 5° C in the customary manner with 27 parts by volume of 4 N sodium nitrite. The yellow diazo solution is stirred at 0° – 5° C until only traces of nitrous acid can be detected. The diazo solution is then filtered, with the addition of a little decolorizing charcoal, to give a clear solution. The filtrate is brought to pH 4 by adding 40 parts of crystalline sodium acetate.

At the same time 15.3 parts of 2-methoxy-1,4-bis-acetoacetylaminobenzene are dissolved in 100 parts of water by means of 80 parts by volume of 30% strength sodium hydroxide solution and 5 parts of n-butylsulphoricinoleate are added. This solution is then filtered with a little decolorizing charcoal to give a clear solution and is then added dropwise with good stirring to the diazo solution over the course of ½ hour. The mixture is stirred at room temperature for 1 to 2 hours until diazo solution can no longer be detected, and is then warmed to 80° – 85° C over the course of 1 hour and filtered hot and the residue is washed free from salt with hot water. After drying at 95° – 100° C in vacuo, 40 parts of an orange dyestuff of the formula

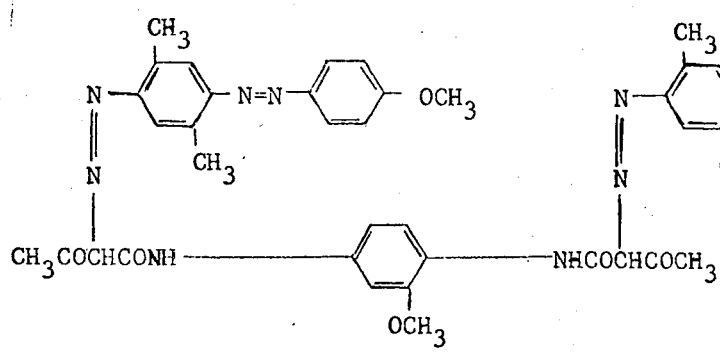

are obtained.

40 parts of the pigment thus obtained are stirred in 450 parts by volume of o-dichlorobenzene at 145° – 150° C for 2 hours. In the course thereof the dyestuff assumes a uniformly crystalline form. It is filtered off at 140° C and washed with hot o-dichlorobenzene until the filtrate comes through nearly colorless, and is then washed with cold methanol and finally with hot water. After drying, 33 parts of an orange organic pigment are obtained. In printing inks it gives strong and pure orange prints.

The table which follows describes further dyestuffs which are obtained by coupling the diazotized bases of column I with the bisacetoacetyl-arylides of the diamines of column II. Column III gives the color shade of a linseed oil varnish colored with 20% of these pigments.

| Ex. No. | I | II | III |
| --- | --- | --- | --- |
| 3 | 4-Aminoazobenzene | 1,4-Phenylenediamine | yellow |
| 4 | " | 2-Chloro-1,4-phenylenediamine | " |
| 5 | 4-Aminoazobenzene | 2-Methyl-1,4-phenylenediamine | yellow |
| 6 | " | 2-Methoxy-1,4-phenylenediamine | " |
| 7 | " | 2-Chloro-5-methyl-1,4-phenylenediamine | " |
| 8 | " | 2-Chloro-5-methoxy-1,4-phenylenediamine | " |
| 9 | " | 2,5-Dimethyl-1,4-phenylenediamine | " |
| 10 | " | 2-Methyl-5-methoxy-1,4-phenylenediamine | " |
| 11 | " | 2,5-Dimethoxy-1,4-phenylenediamine | orange |
| 12 | " | 1,3-Phenylenediamine | yellow |
| 13 | " | 4-Chloro-1,3-phenylenediamine | " |
| 14 | " | 2,5-Diethoxy-1,4-phenylenediamine | orange |
| 15 | 3-Nitro-4-aminoazobenzene | 1,4-Phenylenediamine | " |
| 16 | " | 2-Chloro-1,4-phenylenediamine | yellow |
| 17 | " | 2-Methyl-1,4-phenylenediamine | orange |
| 18 | " | 2,5-Dichloro-1,4-phenylenediamine | yellow |
| 19 | " | 2-Chloro-5-methyl-1,4-phenylenediamine | " |
| 20 | " | 2-Chloro-5-methoxy-1,4-phenylenediamine | brown |
| 21 | " | 2,5-Dimethyl-1,4-phenylenediamine | red |
| 22 | " | 2-Methoxy-1,4-phenylenediamine | brown |
| 23 | 3-Nitro-4-aminoazobenzene | 2,5-Dimethoxy-1,4-phenylenediamine | brown |
| 24 | 4-Amino-2,5-dimethyl-4'-methoxyazobenzene | 1,4-Phenylenediamine | yellow |
| 25 | " | 2-Chloro-1,4-phenylenediamine | " |
| 26 | " | 2-Methyl-1,4-phenylenediamine | " |
| 27 | " | 2,5-Dichloro-1,4-phenylenediamine | " |
| 28 | " | 2-Chloro-5-methyl-1,4-phenylenediamine | " |
| 29 | " | 2-Chloro-5-methoxy-1,4-phenylenediamine | " |
| 30 | " | 2,5-Dimethyl-1,4-phenylenediamine | orange |
| 31 | " | 2-Methoxy-1,4-phenylenediamine | orange |
| 32 | " | 2,5-Dimethoxy-1,4-phenylenediamine | " |
| 33 | 4-Amino-2,5,4'-trimethylazobenzene | 1,4-Phenylenediamine | yellow |
| 34 | " | 2-Chloro-1,4-phenylenediamine | " |
| 35 | " | 2-Methyl-1,4-phenylenediamine | " |
| 36 | " | 2,5-Dichloro-1,4-phenylenediamine | " |
| 37 | " | 2-Chloro-5-methyl-1,4-phenylenediamine | " |
| 38 | " | 2-Chloro-5-methoxy-1,4-phenylenediamine | " |
| 39 | " | 2,5-Dimethyl-1,4-phenylenediamine | orange |
| 40 | 4-Amino-2,5,4'-trimethylazobenzene | 2-Methoxy-1,4-phenylenediamine | orange |
| 41 | 4-Amino-2,5-dimethyl-4'-chloroazobenzene | 1,4-Phenylenediamine | yellow |
| 42 | " | 2-Chloro-1,4-phenylenediamine | " |
| 43 | " | 2-Methyl-1,4-phenylenediamine | " |
| 44 | " | 2,5-Dichloro-1,4-phenylenediamine | " |
| 45 | " | 2-Chloro-5-methyl-1,4-phenylenediamine | " |
| 46 | " | 2-Chloro-5-methoxy-1,4-phenylenediamine | " |
| 47 | " | 2,5-Dimethyl-1,4-phenylenediamine | orange |

-continued

| Ex. No. | I | II | III |
|---|---|---|---|
| 48 | " | 2-Methoxy-1,4-phenylene-diamine | " |
| 49 | 4-Amino-2,5-dimethyl-azobenzene | 1,4-Phenylenediamine | yellow |
| 50 | " | 2-Chloro-1,4-phenylene-diamine | " |
| 51 | " | 2-Methoxy-1,4-phenylene-diamine | orange |
| 52 | " | 2,5-Dimethyl-1,4-phenylenediamine | yellow |
| 53 | 4-Amino-5-methoxy-2-chloro-4'-methyl-azobenzene | 1,4-Phenylenediamine | yellow |
| 54 | " | 2-Methoxy-1,4-phenylene-diamine | orange |
| 55 | 4-Amino-4'-chloro-azobenzene | " | yellow |
| 56 | 4-Amino-4'-methoxy-azobenzene | 2-Methoxy-1,4-phenylenediamine | yellow |
| 57 | 4-Amino-2,5-dimethyl-2'-nitro-azobezene | 2-Chloro-1,4-phenylenediamine | yellow |
| 58 | 4-Amino-2,5-dimethyl-4'-methoxy-azobenzene | 1,3-Phenylenediamine | yellow |
| 59 | 4-Amino-5-chloro-2-methyl-2'-nitro-azobenzene | 2,5-Dichloro-1,4-phenylenediamine | yellow |
| 60 | " | 2,5-Dimethyl-1,4-phenylenediamine | yellow |
| 61 | " | 2-Chloro-5-methoxy-1,4-phenylenediamine | yellow |
| 62 | 4-Amino-2,5-dimethyl-4'-methoxy- | 4-Chloro-1,3-phenylene-diamine | yellow | are run, with stirring, into a solution of 50 parts of concentrated hydrochloric acid and 10 parts of the sodium salt of N-benzyl-$\mu$-heptadecylbenzimidazole-disulphonic acid in 100 parts of ice water, and are then diazotized at 0° – 5° C with 50 parts of 4 N sodium nitrite solution and the mixture is filtered to give a clear solution.

Separately, 31.1 parts of 2-chloro-1,4-bisacetoacetylaminobenzene are dissolved in a mixture of 22 parts of 40% strength sodium hydroxide solution and 800 parts of water and the mixture is filtered to give a clear solution.

The two solutions are fed continuously, if necessary after dilution with water, to a mixing jet, in which an immediate coupling of the components takes place. Care is taken, by regulating the supply of the solutions, that the pH value in the mixing jet is between 4.5 and 5.5. The temperature should be approx. 30° C. This adjustment can be regulated by adding water to the solutions of the components. The resulting suspension of dyestuff is filtered and the filter residue is thoroughly washed; the latter is then stirred with 1,800 parts of o-dichlorobenzene and the mixture is heated to 100° C and filtered hot. The filter residue is washed first with ethylene glycol monomethyl ether, then with methanol and finally with water and is dried in vacuo at 70° C. The yellow dyestuff thus obtained corresponds to the formula

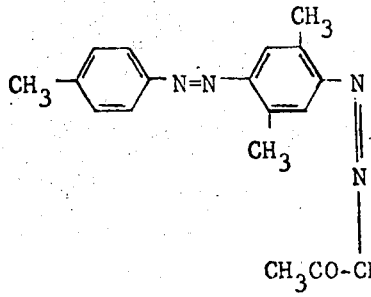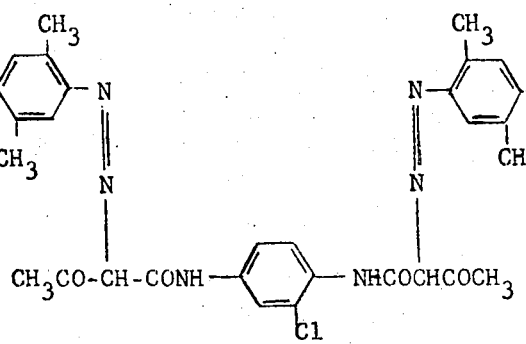

| | azobenzene | | |
|---|---|---|---|
| 63 | " | 4-Methyl-1,3-phenylene-diamine | orange |
| 64 | 4-Amino-2,5-dimethyl-4'-carbomethoxy-azobenzene | 2-Methoxy-1,4-phenylene-diamine | orange |
| 65 | 4-Amino-2,5-dimethyl-2'-chloro-5'-trifluoromethyl-azobenzene | 2,5-Dimethyl-1,4-phenylenediamine | orange |
| 66 | 4-Amino-2,5-dimethyl-4'-phenoxy-azobenzene | " | orange |
| 67 | 4-Amino-2,5-dimethyl-4'-acetyl-amino-azobenzene | " | orange |
| 68 | 4-Amino-2,5-dimethyl-3',5'-di-carbomethoxy-azobenzene | " | orange |
| 69 | 4-Amino-2,5-dimethyl-azobenzene | 1,5-Napthylenediamine | orange |

EXAMPLE 70

25 parts of 4-amino-2,5,4'-trimethylazobenzene are dissolved in 100 parts of warm glacial acetic acid and In printing inks it gives pure and strong yellow prints.

EXAMPLE 71

5.2 parts of 4-amino-2,5-dimethyl-4'-methoxyazobenzene and 3.1 parts of 2-methoxy-1,4-acetoacetylaminobenzene are suspended at 30° C in 200 parts of dichlorobenzene and 30 parts of glacial acetic acid. After cooling to room temperature, 2.5 parts of tert.-butyl nitrite in 50 ml of dichlorobenzene are run in dropwise over the course of 15 minutes, during which the temperature rises to 40° C and the pigment begins to form.

The mixture is then stirred for 2 hours at 40° – 50° C and for 10 hours at 130° – 140° C. In the course thereof the dyestuff assumes a uniformly crystalline form. It is filtered off at 140° C, and washed with hot dichlorobenzene and the dichlorobenzene is displaced by means of methanol and the product is finally washed with hot water. After drying, 6.0 parts of an orange dyestuff of the formula

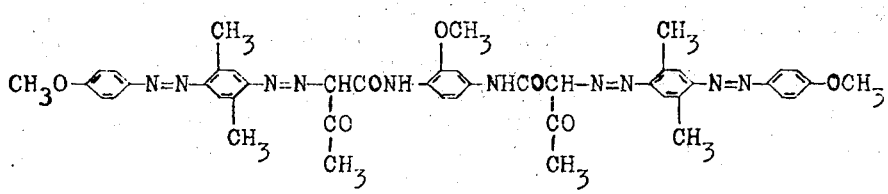

are obtained.

The pigment thus prepared is excellently suitable for the manufacture of easy-flowing printing inks for the graphic industry and yields very strong, pure orange prints with good gloss and transparency.

EXAMPLE 72

1.00 g of the pigment prepared according to Example 2 is finely ground on an Engelsmann grinding machine together with 4.00 g of a printing varnish of the following composition:
- 29.4% of linseed oil — stand oil (300 poises),
- 67.2% of linseed oil — stand oil (20 poises),
- 2.1% of cobalt octoate (8% of Co) and
- 1.3% of lead octoate (24% of Pb), and is then printed onto art printing paper with the aid of an engraved plate by the letterpress process, at 1 g/m². A strong, pure orange shade of good transparency and good gloss is obtained. In three-color or four-color printing very brilliant shades of green can be produced by overprinting on blue.

The pigment is also suitable for other printing processes, such as photogravure, offset printing and flexographic printing and gives very good results here too.

EXAMPLE 73

0.6 g of the pigment prepared according to Example 9 is mixed with 67 g of polyvinyl chloride, 33 g of dioctyl phthalate, 2 g of dibutyltin dilaurate and 2 g of titanium dioxide and the mixture is processed on a roll mill for 15 minutes at 160° C to give a thin sheet. The orange dyeing thus produced is deeply colored and fast to migration and light.

What we claim is:
1. A tetrakisazo pigment of the formula

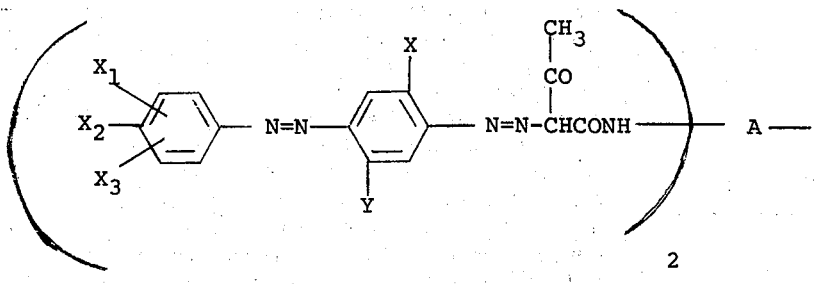

wherein A denotes naphthylene or

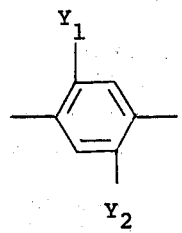

X denotes hydrogen, chloro, alkyl containing 1–4 carbon atoms, alkoxy containing 1–4 carbon atoms, nitro, methoxycarbonyl, Y denotes hydrogen, chloro, bromo, alkyl containing 1–4 carbon atoms or alkoxy containing 1–4 carbon atoms, $X_1$ denotes hydrogen, chloro, alkyl containing 1–4 carbon atoms, alkoxy containing 1–4 carbon atoms, alkanoylamino containing 1–4 carbon atoms, nitro, nitrile, trifluoromethyl, methoxycarbonyl, phenoxy, aroylamino, $X_2$ and $X_3$ denote hydrogen, chloro, alkyl containing 1–4 carbon atoms, alkoxy containing 1–4 carbon atoms, nitro, trifluoromethyl, methoxycarbonyl, and $Y_1$ and $Y_2$ denote hydrogen, chloro, bromo, alkyl containing 1–4 carbon atoms, alkoxy containing 1–4 carbon atoms, nitro, nitrile, trifluoromethyl or alkoxycarbonyl containing 2–6 carbon atoms.

2. Tetrakisazopigment of the formula

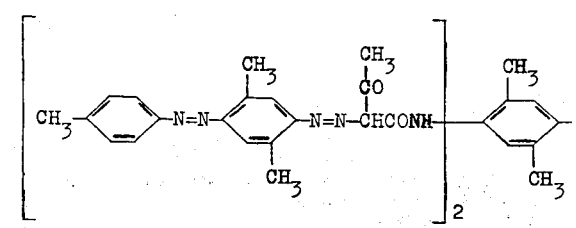

3. Tetrakisazopigment of the formula
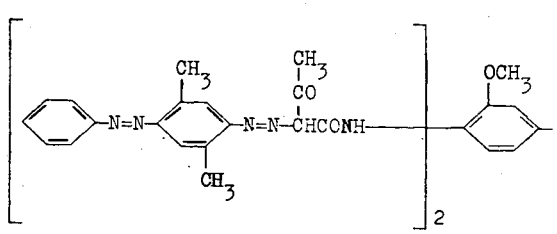
4. Tetrakisazopigment of the formula
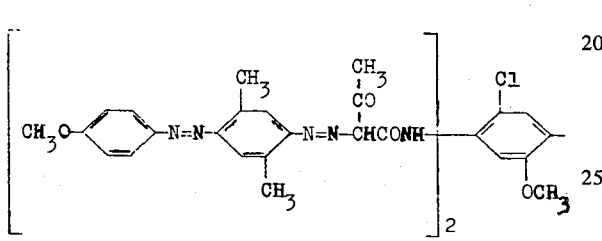
5. Tetrakisazopigment of the formula
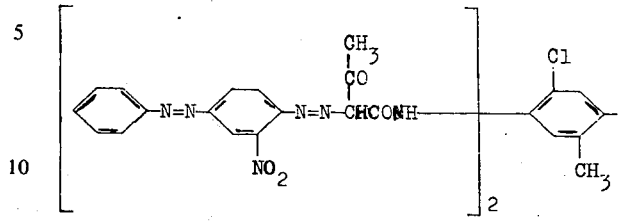
6. Tetrakisazopigment of the formula
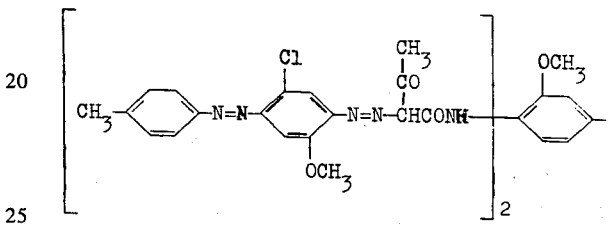
* * * * *